JONES & FILLMORE.
Carriage Wheel.

No. 108,794.  Patented Nov. 1, 1870.

Witnesses:
A. W. Almqvist
Alex F. Roberts

Inventor:
J. M. Jones
C. W. Fillmore
per Munn & Co
Attorneys.

UNITED STATES PATENT OFFICE.

THOMAS M. JONES AND CHARLES W. FILLMORE, OF CHICAGO, ILLINOIS.

IMPROVEMENT IN CARRIAGE-WHEELS.

Specification forming part of Letters Patent No. 108,794, dated November 1, 1870.

*To all whom it may concern:*

Be it known that we, THOMAS M. JONES and CHARLES W. FILLMORE, of Chicago, in the county of Cook and State of Illinois, have invented a new and useful Improvement in Carriage-Wheels; and we do hereby declare that the following is a full, clear, and exact description thereof, which will enable others skilled in the art to make and use the same, reference being had to the accompanying drawing, forming part of this specification.

Our invention relates to carriage-wheels, and our objects are as follows: first, to combine wood and iron in such manner as to retain all the necessary strength, while we dispense with much of the metal, secure lightness, and also produce a comparatively cheap hub; secondly, to brace a wooden hub and spokes by a single piece of metal, which shall be tubular, so as to combine the greatest degree of strength with the least amount of metal.

Figure 1:
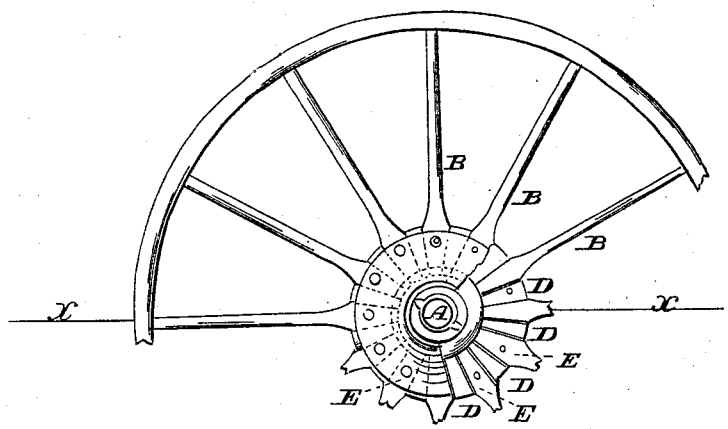
Figure 2:
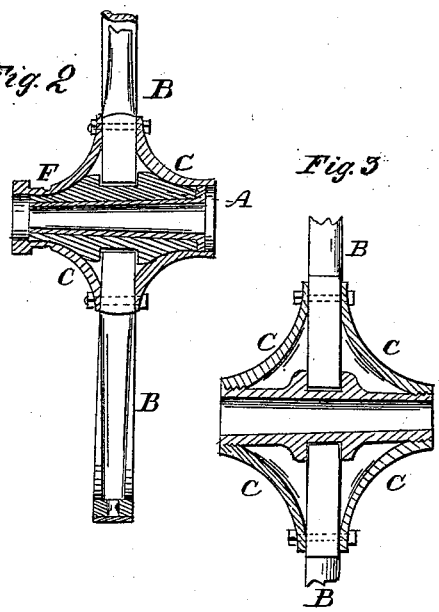

In the accompanying drawing, Figure 1 is a sectional side view of a wheel constructed according to our invention. Fig. 2 is a cross-section of Fig. 1 on the line $x\ x$.

Similar letters of reference indicate corresponding parts.

A represents the wheel-hub, made of wood, metal, or other material, having a groove around it, which the ends of the spokes B enter, as seen in Fig. 2.

C C represent tubular clamp-plates, which set over and support the hub on each side of the wheel, and between which the spokes are clamped or confined by means of bolts or rivets, as seen in the drawing. These bolts or rivets, more or less in number, pass through the spokes or between the spokes, and are secured by nuts, or by riveting on the outside of the plates.

Between the spokes there are tightly-fitting keys D, by means of which the spokes may be tightened at any time by driving the keys. In the other direction the spokes are tightened by screwing up the bolts or tightening the rivets E.

The plates C C, it will be seen, not only serve the purpose of bands for the hub and greatly strengthen it, but secure the whole strength of the spokes edgewise.

By means of the keys D acting in one direction and the plates C in the other direction, (when both are tightened up,) there is no chance for the wheel to rack or the spokes to become loose. By this arrangement the leverage on the spokes by the strain on the felly of the wheel is greatly reduced, the fulcrum being removed so much farther from the center of the hub than in the ordinary wheel.

When the hub is made of wood, as represented in Figs. 1 and 2, there is a groove or indentation, F, in the plates C, which, when the hub is wedged, as seen in the drawing, will hold the wood and render the hub more solid and durable.

Figure 3:
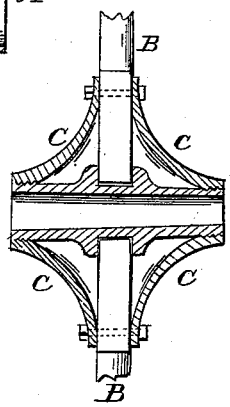

When the hub is made of metal, a screw-thread is cut upon its ends, and in the tubular portion or neck of the plates C, and the plates are screwed onto the hubs, as seen in Fig. 3.

The advantage of this mode of constructing wheels will be obvious to all who are at all acquainted with the subject.

Having thus described our invention, we claim as new and desire to secure by Letters Patent—

1. The inwardly-curved braces C C, applied to the hub of a vehicle, as and for the purpose described.

2. The inwardly-curved braces C C, combined with solid spokes, wedge-formed at the end, and touching in the socket, or having keys between them, as described.

The above specification of our invention signed by us this 19th day of February, 1870, and 21st day of February, 1870.

THOMAS M. JONES.
CHARLES W. FILLMORE.

Witnesses for Jones:
A. C. ODELL,
JOHN FISHBACK.

Witnesses for Fillmore:
GEO. W. MABEE,
WM. HADAWAY.